(12) United States Patent
Hite et al.

(10) Patent No.: US 7,492,881 B1
(45) Date of Patent: Feb. 17, 2009

(54) INTELLIGENT QUEUING OF TRANSACTION RECORDS

(75) Inventors: Marc Hite, Plano, TX (US); Robert Mudd, Keller, TX (US); Paula Jourde, Allen, TX (US); Jimmie Jones, Jr., Plano, TX (US); Richard Falcone, Addison, TX (US)

(73) Assignee: Evercom Systems, Inc., Irving, TX (US)

( * ) Notice: Subject to any disclaimer, the term of this patent is extended or adjusted under 35 U.S.C. 154(b) by 985 days.

(21) Appl. No.: 10/437,839

(22) Filed: May 14, 2003

(51) Int. Cl.
*H04M 15/00* (2006.01)

(52) U.S. Cl. .............................. 379/114.23; 379/114.01; 379/114.09; 379/114.14; 379/114.15; 379/126

(58) Field of Classification Search ............ 379/112.06, 379/219, 309, 265.09, 265.02, 191, 114.23, 379/114.01, 114.09, 114.21, 114.15, 114.14, 379/126, 114.03, 114.17; 705/13; 709/224
See application file for complete search history.

(56) References Cited

U.S. PATENT DOCUMENTS

| 5,594,791 | A | * | 1/1997 | Szlam et al. | 379/265.09 |
| 5,963,635 | A | * | 10/1999 | Szlam et al. | 379/309 |
| 6,018,717 | A | * | 1/2000 | Lee et al. | 705/13 |
| 6,269,399 | B1 | * | 7/2001 | Dyson et al. | 709/224 |
| 6,614,894 | B1 | * | 9/2003 | Brockman et al. | 379/112.06 |
| 7,106,843 | B1 | * | 9/2006 | Gainsboro et al. | 379/191 |
| 2003/0198336 | A1 | * | 10/2003 | Rodenbusch et al. | 379/265.02 |

OTHER PUBLICATIONS

Nadia Draizin, et al., U.S. Appl. No. 10/022,946, entitled "A Method for Determining an Entity Responsible for Billing a Called Party," filed Dec. 17, 2001.
John J. Viola, et al., U.S. Appl. No. 10/135,878, entitled "Information Management and Movement System and Method," filed Apr. 29, 2002.
Richard Falcone, et al., U.S. Appl. No. 10/360,248, entitled "Systems and Methods for Account Establishment and Transaction Management Using Interrupt Messaging," filed Feb. 7, 2003.
Richard Falcone, et al., U.S. Appl. No. 10/360,442, entitled "Systems and Methods for Transaction Authorization Determination," filed Feb. 7, 2003.

* cited by examiner

*Primary Examiner*—Thjuan K Addy
(74) *Attorney, Agent, or Firm*—Slater & Matsil, L.L.P.

(57) ABSTRACT

Disclosed are systems and methods which provide intelligent queuing with respect to processing transaction records. According to one embodiment, transaction records, such as collect calling records, are initially processed to a point that they are ready for release to an appropriate third party for further processing, billing, and/or collection, and are submitted to a queue. Queued transaction records preferably have initial queuing period information associated therewith. Embodiments dynamically change such queuing period information while a transaction record is pending in the queue, such as based upon further intelligence collected with respect to the party to the transaction, based upon subsequent transaction behavior, etcetera.

27 Claims, 3 Drawing Sheets

INTELLIGENT QUEUING OF TRANSACTION RECORDS

CROSS-REFERENCE TO RELATED APPLICATIONS

The present invention is related to copending and commonly assigned U.S. patent application Ser. No. 10/022,946 entitled "Method for Determining an Entity Responsible for Billing a Called Party," filed Dec. 17, 2001, Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/360,248 entitled "System and Method for Account Establishment and Transaction Management Using Interrupt Messaging," filed Feb. 7, 2003, and Ser. No. 10/360,442 entitled "Systems and Methods for Transaction Authorization Determination," filed Feb. 7, 2003, the disclosures of which are hereby incorporated herein by reference.

TECHNICAL FIELD

The present invention relates generally to transaction record processing and, more particularly, to intelligent queuing of transaction records for processing.

BACKGROUND OF THE INVENTION

It is not uncommon today for a particular transaction to involve entities other than the parties directly involved in conducting the transaction. For example, a third party entity will often be involved in accounting for, billing, and/or collecting revenues associated with a particular transaction. Commercial transactions in which an individual employs a credit card to pay a vendor for goods and services is one situation in which a third party, here the credit card issuer, is involved in billing and collecting revenues from a party to the transaction. Collect calling and calling card calling services are another situation in which a third party, here a local exchange carrier (LEC) or calling card provider, is involved in billing and collecting revenues from a party to the transaction. However, in order to properly account and collect payment for such transactions, records of the transaction must generally be created and processed.

As a specific example of providing services wherein entities other than the parties directly involved in conducting the transaction are utilized in accounting for, billing, and/or collecting revenues, a call processing system may be deployed in association with a particular facility to facilitate collect calling services. For example, a call processor may be deployed at an inmate facility, such as a prison, jail, or penitentiary, to allow inmates to place calls to friends, family, attorneys, bail bondsmen, etcetera. However, such inmates generally do not have readily available liquid assets, and therefore such calls must often be charged to the called party, e.g., the friend, family member, attorney, or bail bondsman.

Typically, when placing a collect call, a call record, such as may include dial number, originating number, time of call, duration of call, etcetera, will be created at the switch or the call processor at the facility. On a periodic basis these call records will generally be collected centrally, such as through implementation of a polling process, for processing. Typically, the call records will be processed to make routing determinations, e.g., identifying a LEC responsible for billing the called party, and the records will be "out-cleared" for collection. That is, when call records are out-cleared to a third party, the accounts receivable for those particular calling services are sold to a third party, such as the aforementioned LEC, for billing and collection since the LEC already has a business relationship in place with the called party (the party to the transaction responsible for the charges incurred for the service). Therefore, ownership and control of the call record and the receivables associated therewith is transferred from the service provider, or other initial owner, to a third party, such as the aforementioned LEC.

Such out-clearing of records is typically accomplished promptly following processing of such call records. Accordingly, out-clearing generally results in the transferring of call record data to the LECs or other entities relatively quickly after the calling services have been provided.

Billing and collection for calling services by LECs or other third parties is typically done at a cost. For example, a per page charge, such as on the order of one dollar ($0.50-1.50), for including billing statements in a LEC bill may be made. Additionally, a per call charge, such as on the order of one or two cents ($0.01 or $0.03), for each call billed may be made by the LEC. Moreover, a LEC may withhold a portion of the amount of the accounts receivable purchased, such as on the order of 10-20%, for expected bad debt. Payments of excess withheld amounts may not be tendered by the LECs until several months have transpired since the out-clearing of the records, when the LEC is able to determine that the level of bad debt has not been as great as the amounts withheld.

According to conventional wisdom, minimizing the time between providing the calling services and out-clearing of the call records is desirable in order to minimize the time for collecting upon these accounts. However, releasing of such accounts to third parties, such as the aforementioned LECs, results in a loss of control and visibility by the service provider with respect to the party to the transaction. Accordingly, if a customer service issue arises after processing of a call, the calling service provider often finds it necessary to involve the LEC, such as to determine if the party has made payment, to have a party make a payment when a payment verification point (PVP) is reached (e.g., a dollar limit on the unpaid value of calling services provided is reached), etcetera.

Moreover, the business relationship between the calling service provider and the LEC often requires that bad debt be held below a particular threshold, such as a percentage corresponding to the aforementioned payment withholding percentage. However, a calling service provider is often unable to adequately assess the risk involved with respect to providing calling services to a particular party during the time a call is being set up. Accordingly, a calling service provider may inadvertently out-clear call records having bad debt associated therewith in excess of the agreed upon percentage, thereby causing the calling service provider to breach the agreement with the LEC and possibly forfeiting the ability to sell such accounts receivable to that LEC for billing and collection.

BRIEF SUMMARY OF THE INVENTION

The present invention is directed to systems and methods which provide intelligent queuing with respect to processing transaction records. According to embodiments of the present invention, transaction records, such as collect calling records, are initially processed to a point that they are ready for out-clearing, e.g., release to an appropriate third party for further processing, billing, and/or collection, however some or all of the records are preferably submitted to a queue rather than being out-cleared. Accordingly, transaction record processing according to embodiments of the present invention may include assigning initial queuing period information with respect to transaction records for queuing prior to release of the transaction records to a third party. Embodiments of the present invention dynamically change such queuing period information while a transaction record is pending in the queue, such as based upon further intelligence collected with respect to the party to the transaction, based upon subsequent transaction behavior, etcetera.

In operation according to preferred embodiments of the present invention, rather than immediately out-clearing transaction records the transaction records will be processed, such as to determine routing information etcetera, and they will then be queued for a period of time, which may be adjusted dynamically. An intelligent queue according to embodiments of the invention is inserted in the transaction record process before what today would be a step of record out-clearing in call record processing systems. Accordingly, embodiments of the invention will intercept transaction records, which are otherwise ready for out-clearing, from being out-cleared and instead hold those transaction records in a queue for a period of time.

Queue times may be account specific, e.g., based upon a particular party to the transaction. Additionally or alternatively, queue times may be influenced by factors other than a particular account, such as billing and collection costs, a risk profile associated with the LEC, tier and decile information associated with calling and/or called parties, the billing cycle of a particular third party, the velocity of transactions (e.g., the number of calls made as a function of time) made with respect to a particular party, changes in velocity of transactions (e.g., a particular party suddenly increases velocity with respect to placing calls), the typical length of stay for individuals in a particular facility, etcetera. Once queued, the queue times of particular transaction records may be adjusted dynamically, such as in response to transaction activity or information gathered with respect to a party to the transaction (e.g., one or more of the above factors and/or changes associated therewith may be utilized in dynamically adjusting queue times). For example, there may be a rule matrix from which it may be determined whether the queue period should be shortened or lengthened.

Once in an intelligent queue according to the present invention, there are preferably a variety of activities that can happen with respect to the transaction records as an associated account or risk profile is monitored and/or changed. For example, if it is determined that there is too much risk associated with a particular account to out-clear associated transaction records to a LEC, such as because fraudulent activity has been detected in a subsequent transaction or transaction velocity turns out to be abnormally high, operation of the present invention may route that account's transaction records to be out-cleared through a direct bill platform or a prepaid platform, rather than permitting out-clearing through a third party after the queue period. In some cases it may be apparent that a party to particular transaction is no longer at a facility, e.g., an inmate at a jail facility has been released and thus an associated account will have no more usage, and there is no ongoing reason for holding the transaction records in the queue. Accordingly, an initially assigned queue time may be shortened to provide earlier out-clearing of particular transaction records. Alternatively, it might be decided that particular transaction records should be held in the intelligent queue for longer than initially determined, as decisions are continually made to mitigate risk associated with the account. It may be determined that it is not economically sound to out-clear a particular transaction record or records to a LEC or other third party for billing and collection, such as because there is a minimum fixed cost associated with each account so processed, and therefore those transaction records may not be released from the intelligent queue for out-clearing. For example, where an account does not have enough activity to warrant the cost of out-clearing for billing and collection, embodiments of the present invention may choose to store those transaction records to a file for future processing, such as to establish direct billing or a prepaid account, if and when a party to those transactions again seeks to conduct another transaction.

While transaction records are in an intelligent queue waiting to be out-cleared according to embodiments of the invention, customer service agents will preferably have access to the queued transaction records and will be in a position to be able to take payments against the debt associated with those transaction records. Accordingly, a customer service agent will be enabled to reduce the balance associated with a particular customer in real-time, without requiring involvement of a LEC or other third party.

Upon reaching the queue time, as may have been adjusted from time to time, the transaction records will preferably be out-cleared for billing and/or collection, such as by an appropriate LEC or other third party. However, while the call records are queued according to embodiments of the present invention, the calling service provider continues to "own" and control the accounts receivable and may elect to process the call record in a manner different than originally anticipated, such as to direct bill, deduct from a prepaid account, directly solicit funds from a party, and the like, where out-clearing to a third party was initially planned.

It should be appreciated that embodiments of the present invention provide a variety of advantages over a model in which transaction records are substantially immediately out-cleared to third parties. Intelligent queuing of transaction records according to embodiments of the present invention may be utilized to address billing collection costs. For example, transaction records associated with a particular account may be queued to allow sufficient value to accrue to offset billing collection costs. Moreover, such intelligent queuing may be utilized to minimize the opportunity for transactions associated with a particular account to be split between the LEC's, or other third party's, billing cycle, thereby incurring additional billing and collection costs for a given set of transactions.

A further advantage of intelligent queuing of transactions according to embodiments of the present invention is that the service provider, or other entity queuing the transactions, retains ownership and control with respect to the accounts receivable or other aspects of the transaction records, allowing continued flexibility with respect to their further processing as well as the ability to offer greater customer service. For example, by retaining control of the transaction records, a service provider may later determine that transaction records associated with a particular account should be processed for collection other than by out-clearing to a third party, such as to direct bill a particular party to the transaction, to solicit and/or accept payment by phone, etcetera. Similarly, by retaining control of the transaction records, customer service agents of the service provider may be enabled to respond more quickly and accurately to parties inquiring with respect to their accounts, as the service provider will have direct knowledge of transaction records for which payments have not been made rather than having to query a LEC or other third party to determine the status of payment with respect to all transaction records. Moreover, such customer service agents are enabled to respond to such queries in ways not possible when the transaction records have already been out-cleared to third parties, such as to directly accept payment from the parties.

A still further advantage of intelligent queuing of transactions according to embodiments of the present invention is that risks attendant with such transactions may be better managed. For example, as an account evolves and changes through usage over time, a service provider or other entity may gain intelligence about that account, make decisions about changing risk profiles with respect to that account, and take appropriate action to better manage and mitigate the risk. As further information is collected with respect to particular entities to a transaction and/or particular accounts, risk profiles may be adjusted and, therefore, a determination made that particular transaction records should be processed for collection other than by out-clearing to a third party, such as to direct bill a particular party to the transaction, to solicit and/or accept payment by phone, etcetera. Accordingly, an intelligent queue of embodiments of the present invention may be dynamically altered to manage risk.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
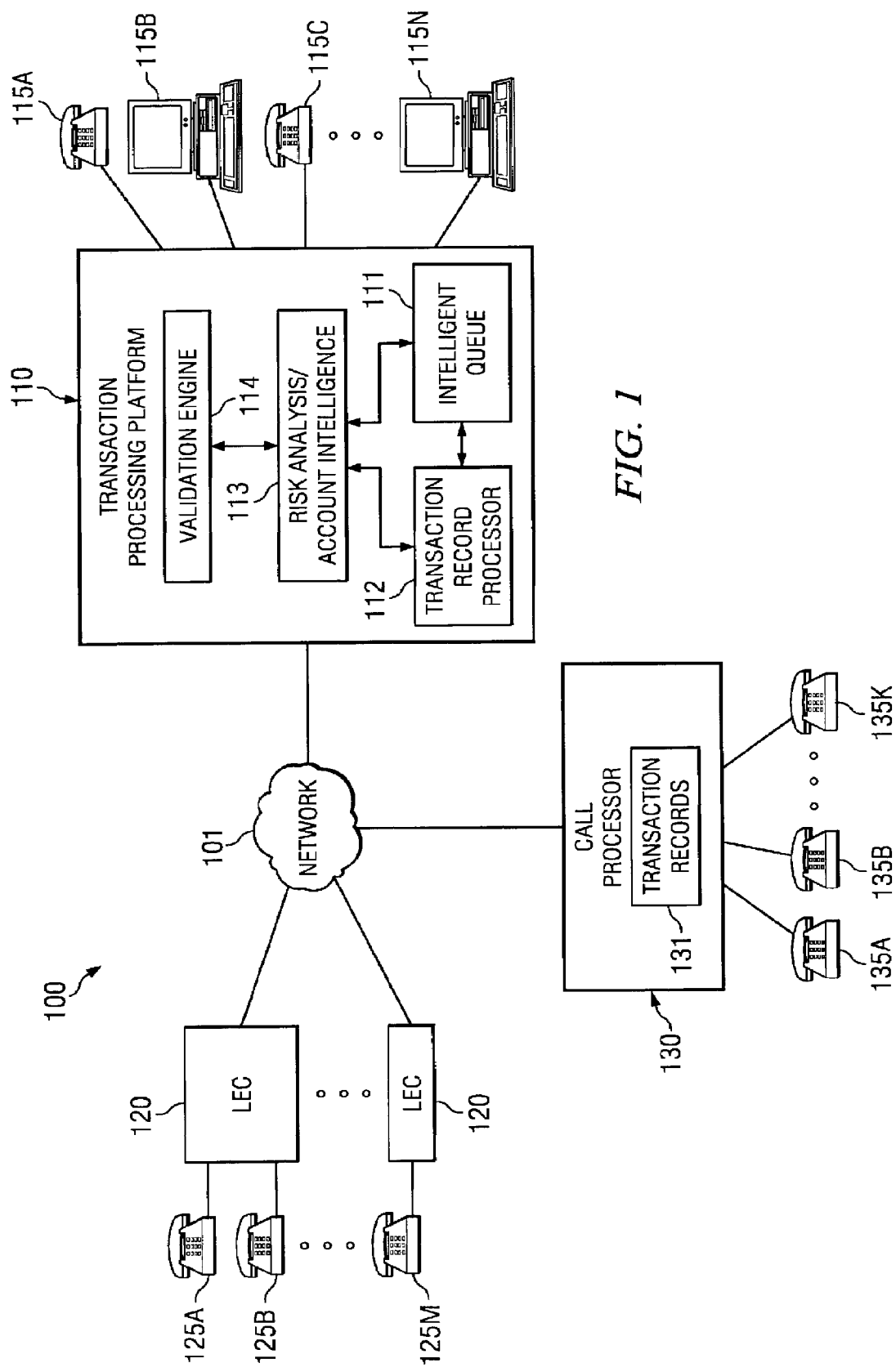
FIG. 1 shows a block diagram of a transaction system in which an embodiment of the present invention is implemented.

Directing attention to FIG. 1, a system in which an embodiment of the present invention is deployed is shown generally as system 100. System 100 includes call processor 130, as may be disposed at a facility such as an inmate facility, a hotel, a hospital, a camp, a business, etcetera, providing management of calling services between parties at terminals 135A-135K and parties at terminals 125A-125M. For example, a party staying at a facility associated with call processor 130 may wish to place a phone call to a party associated with a particular one of terminals 125A-125M and, accordingly, invoke a calling service, such as a collect or reverse charge call, using one of terminals 135A-135K.

Call processor 130, such as may comprise a system as shown and described in the above referenced patent application entitled "Information Management and Movement System and Method," may arbitrate connection of terminals 135A-135K to terminals 125A-125M via network 101, such as may comprise the public switched telephone network (PSTN), in providing such services to facilitate payment to a service provider associated with call processor 130. For example, call processor 130 may be in communication with a transaction validation engine, such as validation engine 114 of transaction processing platform 110, for a determination with respect to whether a particular service should be performed, such as shown and described in the above referenced patent applications entitled "Method for Determining an Entity Responsible for Billing a Called Party," "Optimizing Profitability in Business Transactions," "System and Method for Account Establishment and Transaction Management Using Interrupt Messaging," and "Systems and Methods for Transaction Authorization Determination." The aforementioned validation engine may invoke risk analysis and/or other intelligence, such as risk analysis/account intelligence 113, in determining whether to permit or block a particular transaction. It should be appreciated that validation, risk analysis, and/or account intelligence may be disposed centrally for use by a number of call processors, as shown in the example of transaction processing platform 110, and call processor 130 may communicate therewith via network 101, such as may comprise a local area network (LAN), metropolitan area network (MAN), wide area network (WAN), the Internet, a cable network, the PSTN, etcetera. Additionally or alternatively, aspects of the aforementioned validation, risk analysis, and/or account intelligence may be disposed locally with respect to call processor 130, such as within call processor 130, if desired.

A particular called party may be provided calling services by a third party, such as a particular one of local exchange carriers (LECs) 120, which bills and collects from the called party for calling services. In order to be paid for collect calls placed to a party at terminals 125A-125M, a service provider associated with call processor 130 may collect transaction records associated with the call, such as within transaction records 131, for submission to an appropriate one of LECs 120 for billing and collection.

According to a typical paradigm, the aforementioned transaction records would be collected periodically, such as in real-time or daily, by the service provider for processing, such as by transaction processor 112. In processing, a step of "routing" may be performed to identify the particular third party, e.g., a particular one of LECs 120, responsible for billing and collecting services provided to one of terminals 125A-125M associated with the call. Thereafter, the transaction record may be out-cleared, or released, to the LEC identified in the routing step for further processing, e.g., billing and collection. The service provider is generally paid some percentage of the value of the transaction records out-cleared to each LEC or other third party, although some percentage of this amount (often in the range of 10-20%) is withheld for potential bad debt experienced by the LEC in collecting the accounts. Accordingly, conventional wisdom is that immediate out-clearing of such records is desired in order to minimize latency in collecting for services rendered, and thus the out-clearing of transaction records as provided in the past has been substantially immediately upon processing of the transaction records.

However, once the service provider out-clears the transaction records to the LECs or other third parties for billing and collection, the service provider loses control and visibility with respect to those transaction records. For example, if a party were to approach a payment verification point (PVP), e.g., a limit of value before invoking some form of payment verification, customer service agents for the service provider (such as may be disposed at one or more of terminals 115A-115N) may be unable to determine the extent of unpaid services by a particular party due to lack of control and visibility with respect to out-cleared transaction records. Accordingly, a customer service agent may be required to contact a LEC to confirm whether or not a party has paid the LEC for transactions performed by the service provider in order to determine if the party should be continued to be provided services by the service provider. If it is determined that the party has transaction value outstanding at or exceeding such a PVP and the party is willing to tender payment in order to continue to receive services, it may be incumbent upon the customer service agent to require the party to contact the LEC in order to settle the out-cleared transaction records rather than accepting payment directly from the party.

Moreover, if later acquired intelligence and/or risk analysis indicates that a particular party is not well suited for collection through a third party, such as the aforementioned LEC, once the transaction records are out-cleared there is little if anything that the service provider can do to mitigate risk associated with payment. For example, if it is subsequently determined that, although initial analysis indicated that a particular billed number has been associated with timely payment, a billed number has recently been unpaid, the service provider is generally unable contact a party to the transaction and solicit direct payment of transactions for which the transaction records have already been out-cleared to a third party.

Embodiments of the present invention provide a queue, shown as intelligent queue 111 in the embodiment of FIG. 1, for queuing transaction records prior to out-clearing, e.g., out-clearing to third parties for further processing. Preferably, transaction records are processed, substantially as described above, to a point just before their out-clearing to a LEC or other third party for further processing, such as for billing and collection. Accordingly, intelligent queue 111 of the illustrated embodiment is in communication with transaction record processor 112. Queue 111 of the illustrated embodiment receives transaction records for queuing from transaction record processor 112 and upon release from the queue, such as upon expiration of a queue time, provides transaction records to transaction processor 112 for completing processing, such as to out-clear the transaction records.

Once the transaction records are queued, a considerable amount of control and visibility is available with respect to the transaction records according to the present invention. A service provider, for instance, may be provided increased visibility with respect to how much a party has spent with the service provider and what sort of activity (e.g., transaction velocity and/or amounts) is associated with particular parties and/or accounts. Moreover, the service provider retains control with respect to those transaction records so that, as a party's risk profile changes, even past transactions may be handled accordingly to mitigate risk and/or optimize revenues.

For example, if a party is provided with a $200 payment verification point, and that party has accumulated $190 worth of activity in transaction records residing in the queue, it may be determined that the party is fairly high risk and therefore the service provider should be cautious with respect to sending the transaction records to a third party, such as a LEC, and hoping the party pays in response to the third party's billing cycle. In such a situation, the party has accumulated a relatively large amount of debt to the service provider, and there is a significant risk that there will be bad debt associated with that party. However, it will often be months later, after the third party has undergone all of its bill processing and collection, that the service provider is notified of any problems with respect to collection of the debt. In the meantime, the party may continue to accrue charges with the service provider, thereby further aggravating the situation.

Holding transaction records in a queue of the present invention allows a service provider to not only analyze information with respect to the parties and/or account which might otherwise not be available, but also to retain control over the transaction records so that proper mitigating actions may be taken. For example, the service provider may make new routing decisions about how the party is to be billed, such as whether the party should be moved to a prepay option. In operation, the service provider may initiate a call to the party and require that payment for past and/or future transactions be made before any further transactions are authorized. Additionally or alternatively, the next time the party attempts to conduct a transaction, the service provider may implement interrupt messaging, such as shown and described in the above referenced patent application entitled "System and Method for Account Establishment and Transaction Management Using Interrupt Messaging," requiring that payment for past and/or future transactions be made before any further transactions are authorized. Alternatively, the service provider may determine that the party should be moved to a direct bill plan, in which the service provider has greater control and greater visibility over the party's account and activity.

As another example, the service provider might decide that the transaction records in the queue associated with a particular party or account are not economically sufficient to out-clear to any of the available sources, e.g., third party billing, direct billing, and/or prepaid account. For instance if a party has only accumulated $0.80, it may not make sense to bill the party in any capacity.

Queuing transaction records according to embodiments of the present invention also provide a benefit in that it facilitates collection of payments to using a customer service function. Accordingly, rather than having to direct a party to contact a third party, such as a LEC, when a payment issue arises, such as reaching a payment verification point, when a service provider has released transaction records to the third party, customer service agents of the service provider are empowered to accept payments from parties associated with transaction records held in queue.

Accordingly, implementation of transaction record queues according to preferred embodiments of the present invention provides for a variety of activities with respect to the transaction records as an associated account or risk profile is monitored and/or changed. For example, if it is determined that there is too much risk associated with a particular account to out-clear associated transaction records to a LEC, such as because fraudulent activity has been detected in a subsequent transaction or transaction velocity turns out to be abnormally high or suddenly increases, operation of the present invention may route that account's transaction records to a direct bill platform or a prepaid platform, rather than permitting out-clearing to a third party after the queue period. In some cases it may be apparent that a party to particular transaction is no longer at a facility, e.g., an inmate at a jail facility has been released and thus an associated account will have no more usage, and there is no ongoing reason for holding the transaction records in the queue. Accordingly, an initially assigned queue time may be shortened to provide earlier out-clearing of particular transaction records. Alternatively, it might be decided that particular transaction records should be held in the intelligent queue for longer than initially determined, as decisions are continually made to mitigate risk associated with the account.

Accordingly, intelligent queue 111 of the illustrated embodiment is in communication with risk analysis/account intelligence 113. Queue 111 of the illustrated embodiment receives updated transaction record queue information, such as revised queue times, dynamically from risk analysis/account intelligence 113 and/or transaction record processor 112 and may provide information and statistics with respect to queued transaction records to risk analysis/account intelligence 113 and/or transaction record processor 112.

It should be appreciated that, according to preferred embodiments, customer service agents, such as those utilizing one or more of terminals 115A-115N, will have access to the queued transaction records while they are held in queue 111 waiting to be out-cleared and will be in a position to be able to take payments against the debt associated with those transaction records. Accordingly, a customer service agent will be enabled to reduce the balance associated with a particular customer in real-time, without requiring involvement of representatives of LECs 120 or other third party.

Figure 2:
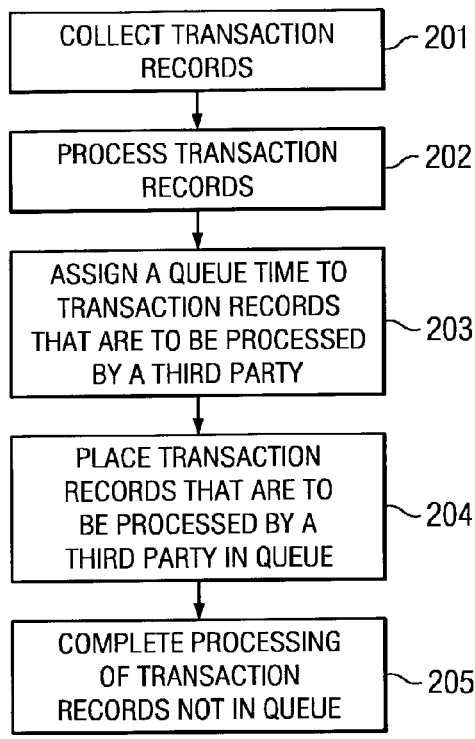
FIG. 2 shows a flow diagram of transaction record processing according to an embodiment of the present invention.
Figure 3:
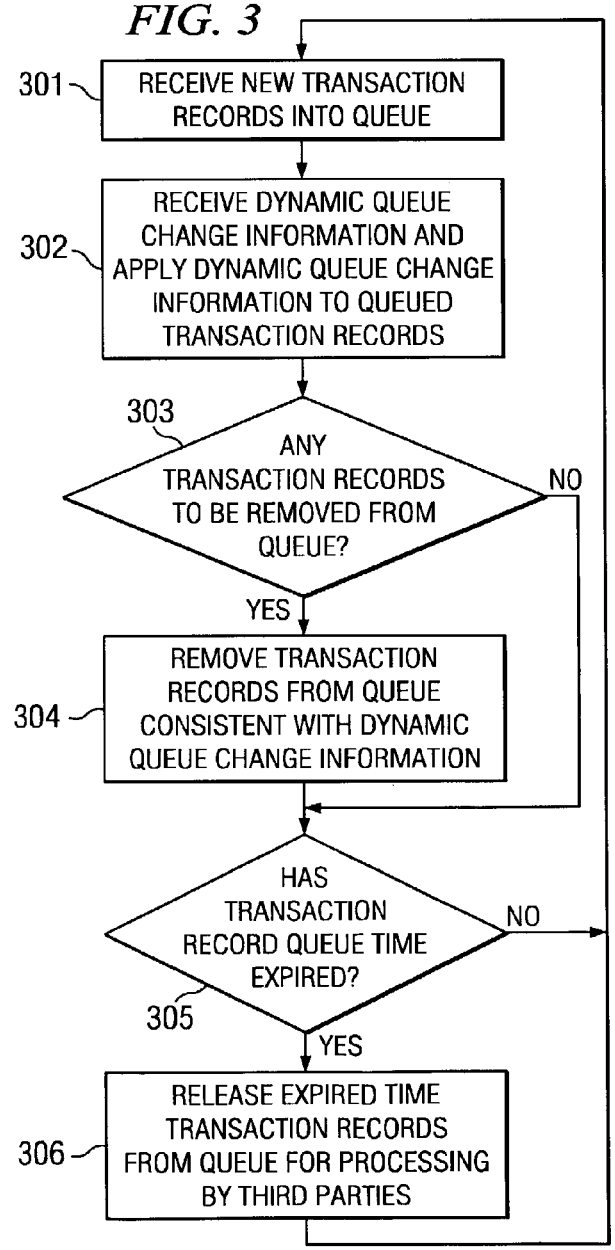
FIG. 3 shows a flow diagram of operation of a transaction record queue according to an embodiment of the present invention.

FIGS. 2 and 3 provide flow diagrams of operation of various aspects of embodiments of the present invention. Specifically, FIG. 2 provides a flow diagram of processing of transaction records, such as by transaction record processor 112 of transaction processing platform 110. FIG. 3 provides a flow diagram of operation of a preferred embodiment transaction record queue, such as intelligent queue 111 of transaction processing platform 110.

Directing attention to FIG. 2, transaction record processing according to a preferred embodiment is shown. At step 201 transaction records are collected, such as in real-time or periodically, by transaction record processor 112, such as from transaction records 131 of one or more call processors. The transaction records may include such information as identification of the parties to a transaction (e.g., account number, calling number, called number, personal identification number (PIN), etcetera), information with respect to the transaction (e.g., the type of transaction, the value of the transaction, the time of the transaction, the duration or length of the transaction, the goods or services associated with the transaction, etcetera), and/or the like.

At step 202, transaction record processor 112 processes the collected transaction records. Such processing may include debiting amounts from prepaid accounts associated with particular transactions, creating billing records for direct billing of particular transactions, processing particular transaction records for out-clearing with third parties, and/or the like.

At step 203, transaction record processor 112 determines and/or assigns an initial queue time for use with transaction records that are to be placed in queue, e.g., transaction records that are to be out-cleared with third parties. Such queue times are preferably assigned upon a transaction record, account, party to the transaction, and/or transaction information basis. For example, a transaction record associated with a particular account and/or a particular party may be assigned a queue time based upon a risk analysis, such as may be provided by risk analysis/account intelligence 113, associated with that account and/or party. Additionally or alternatively, particular types of transactions, transactions associated with particular demographics, or other transaction information may be utilized in determining and assigning queue times. Systems and methods for determining risk associated with, and otherwise rating, parties to a transaction, accounts, and transactions are shown and described in the above referenced patent application entitled "Optimizing Profitability in Business Transactions."

Preferred embodiments of the present invention determine initial queue times through the application of business models in addition to or in alternative to the account, transaction, and/or party information described above. For example, the costs associated with utilizing third parties for billing and collections often includes several sources of charges, such as a cost for printing a bill page (actually printing the page including the service provider's data, including that bill page in the third party's billing, and mailing the bill page) and a cost for each record that is on the bill page (a per record or "line item" charge). The cost for rendering and mailing a bill page in the telephony industry is generally in the range of $0.50-1.50. The cost per record in the telephony industry is generally in the range of $0.01-0.03. Accordingly, the cost of bill rendering may be relatively expensive, particularly when associated with providing calling services which often are on the order of a few dollars per transaction. However, by sending transaction records to a third party, such as a LEC, as soon as those transaction records are acquired, a risk is run of spreading transaction records over multiple bill cycles, thereby incurring bill rendering costs more frequently and/or which are disproportionate to the amount of services being billed. The risk of spreading such billing for transactions over multiple billing cycles is particularly problematic in particular situations, such as with respect to an inmate facility where the average tenure of the inmates that use the transaction services tends to be a week or less. As such, the aforementioned initial queue time business model determination and/or assignment may be based upon business model decisions, e.g., utilizing a business model rule matrix, to optimize revenues and/or mitigate costs associated with billing and collecting for such transactions.

Initial queue times assigned as above may encompass a wide range of times, such as from minutes to months. However, preferred embodiments of the present invention limit queue times to the range of approximately 1 to 30 days. A queue time of 30 days is expected to result in an efficient grouping of call records for LEC billing, assuming a typical 30 day billing cycle. However, many factors, in addition to or in the alternative to the aforementioned billing cycles, may be considered with respect to establishing queue times according to embodiments of the present invention. For example, for calling services provided with respect to facilities having a short resident tenure time (e.g. an average inmate tenure time of 12 hours for a city jail or an average inmate tenure time of 3-7 days for a county jail) may have an initial queue time much shorter than 30 days associated therewith (e.g., 1 day for the city jail and 10 days for a county jail) to improve receivable aging. Of course, the foregoing queue times are merely exemplary of those which might be implemented according to the present invention and implementation of other queue times may be useful in particular situations, such as where empirical operational information has been collected.

At step 204, transaction record processor 112 places transaction records that are to be out-cleared with third parties in intelligent queue 111 for queuing. Accordingly, rather than immediate out-clearing, the transaction records that are to be out-cleared with third parties will be held by intelligent queue 111 for a queue time (the initial queue time associated therewith, as may be dynamically altered from time to time as described below).

At step 205, transaction record processor 112 completes processing of transaction records not held in intelligent queue 111. For example, processing with respect to transaction records which are not to be out-cleared with third parties may be completed, such as to debit a particular account or print a direct billing statement. Additionally or alternatively, processing with respect to transaction records which are to be out-cleared with third parties, but which have been released from intelligent queue 111, may be completed by transaction record processor 112 at step 205, such as to out-clear those records as an associated queue time expires.

Directing attention to FIG. 3, transaction record queue processing according to a preferred embodiment is shown. At step 301 intelligent queue 111 receives new transaction records into the queue. For example, transaction record processor 112 may provide such transaction records to intelligent queue 111 according to step 204 of FIG. 2.

At step 302, intelligent queue 111 receives dynamic queue change information with respect to one or more transaction records held therein and applies the dynamic queue change information to appropriate ones of the transaction records. For example, risk analysis/account intelligence 113 and/or transaction record processor 112 may provide or supplement information with respect to various transaction records, such as updated risk assessments, status with respect to parties to the transaction and/or their accounts, etcetera, which intelligent queue 111 utilizes in determining and dynamically altering queue times of associated transaction records. Additionally or alternatively, systems external to intelligent queue 111, such as risk analysis/account intelligence 113 and/or transaction record processor 112, may provide updated queue times associated with particular transaction records for replacing/overriding the initial queue times associated therewith.

Dynamic adjustment of queue times according to embodiments of the present invention is based upon application of business models, such as described above, to optimize revenues and/or mitigate costs associated with billing and collecting for such transactions. Moreover, dynamic adjustment of queue times according to preferred embodiments of the present invention are made as information with respect to particular parties and/or accounts is gained and learned over time. For example, a service provider may find that a particular individual is delinquent on paying bills, or alternatively that a particular individual is punctual on paying bills, regardless of how initial intelligence suggested the party had behaved in the past and/or with respect to other service providers. By holding the transaction records in queue, embodiments of the present invention provide an opportunity to take action with respect to those transaction records to mitigate risk and/or optimize revenues, such as to call a party and ask for payment, change the billing method to a direct bill from a third party bill, etcetera.

Accordingly, it should be appreciated that dynamic queue change information utilized according to the present invention may comprise information in addition to or other than that associated with transaction record queue time. For example, dynamic queue change information received by intelligent queue 111 may indicate that a particular transaction record held in the queue is to be processed other than by out-clearing with a third party and, therefore, should be released from the queue for further processing.

Intelligent queue 111 of the illustrated embodiment makes a determination at step 303 as to whether any transaction records held therein are to be removed from the queue. For example, if the aforementioned dynamic queue change information indicates that a particular transaction which was previously processed by transaction record processor 112 for out-clearing with a third party is instead to be direct billed, intelligent queue 111 preferably recognizes the status change and determines that the transaction record should no longer be held in the queue. Similarly, if the aforementioned dynamic queue change information indicates a status change, such as a party to a transaction is no longer associated with the facility, there has been no recent activity with respect to a particular account, or the like, intelligent queue 111 may determine that there is no reason to continue holding particular transaction records in queue.

If, at step 303, it is determined that there are transaction records to be removed from the queue, processing according to the illustrated embodiment proceeds to step 304 wherein particular transaction records are released from intelligent queue 111. For example, transaction records for which the aforementioned dynamic queue change information indicates that the transaction records should no longer be held in the queue may be released to transaction record processor 112, such as at step 205 of FIG. 2, for completion of processing with respect thereto (e.g., out-clearing to a third party, direct billing by the service provider, deduction from a prepaid balance, etcetera). If, at step 303 it is determined that there are no transaction records to be removed from the queue, processing according to the illustrated embodiment proceeds to step 305.

It should be appreciated that it may be determined that it is not economically sound to out-clear a particular transaction record or records to a LEC or other third party for billing and collection, or otherwise complete processing with respect to particular transaction records, such as because there is a minimum fixed cost associated with each account so processed. Accordingly, embodiments of the present invention may operate to store those transaction records to a file for future processing, such as to establish direct billing or a prepaid account, if and when a party to those transactions again seeks to conduct another transaction. As such, the aforementioned determination with respect to removing particular transaction records from intelligent queue 111 may operate to make determinations not only with respect to a status and/or state of an account or aspects thereof, but also to apply business models in determining the propriety of continuing to hold and/or providing further processing with respect to transaction records. According to preferred embodiments, removal of particular transaction records from intelligent queue 111 at step 304 may not be for the purpose of further processing such as for out-clearing or other collection efforts, but instead may be to store the transaction records in a database for future determinations and/or processing, such as where an account did not have enough activity to warrant the cost of out-clearing for billing and collection. Of course, such transaction records may continue to remain in queue 111 indefinitely, if desired.

Intelligent queue 111 of the illustrated embodiment makes a determination at step 305 as to whether the queue times with respect to any transaction records held therein have expired. For example, if an initial queue time associated with a particular transaction record has remained unaltered during holding of the transaction record in queue and that initial queue time has elapsed, intelligent queue 111 preferably determines that the queue time for that transaction record has expired. Similarly, if a queue time associated with a particular transaction record, as that queue time has been dynamically altered during holding of the transaction record in queue, has elapsed, intelligent queue 111 preferably determines that the queue time for that transaction record has expired.

If, at step 305, it is determined that there are transaction records for which associated queue times have expired, processing according to the illustrated embodiment proceeds to step 306 wherein particular transaction records are released from intelligent queue 111. For example, transaction records for which an associated queue time has expired may be released to transaction record processor 112, such as at step 205 of FIG. 2, for completion of processing with respect thereto (e.g., out-billing by a third party). If, at step 305 it is determined that there are no transaction records for which associated queue times have expired, processing according to the illustrated embodiment returns to step 301.

Transaction record queue processing according to the embodiment illustrated in FIG. 3 is a looping process to thereby continually providing transaction record processing as described above. Accordingly, upon completion of step 306, processing according to the illustrated embodiment returns to step 301.

Having described embodiments of the present invention with reference to call processing systems and providing intelligent queuing of transaction records associated with calling services, it should be appreciated that the concepts of the present invention are applicable to any number and type of transactions. For example, the use of intelligent queuing of transaction records according to embodiments of the present invention is beneficial with respect to any third party billing arrangement in which there is low visibility into the status of the transaction records and/or where there is a high risk associated with the receivables being sold to a third party.

Moreover, although embodiments have been described herein with reference to queuing transaction records which are to be processed by third parties, it should be appreciated that any type of transaction records, such as those associated with direct bill and prepaid accounts, may be queued using intelligent queues of the present invention. Additionally, the present invention is not limited to use with respect to the system configuration illustrated in FIG. 1. For example, there is no limitation that any aspect of the transaction processing and/or transaction record queuing be provided either locally or centrally with respect to any party to the transaction. Likewise, transaction systems implementing the present invention may provide transaction processing in addition to or in the alternative to that described above, if desired.

Figure 4:
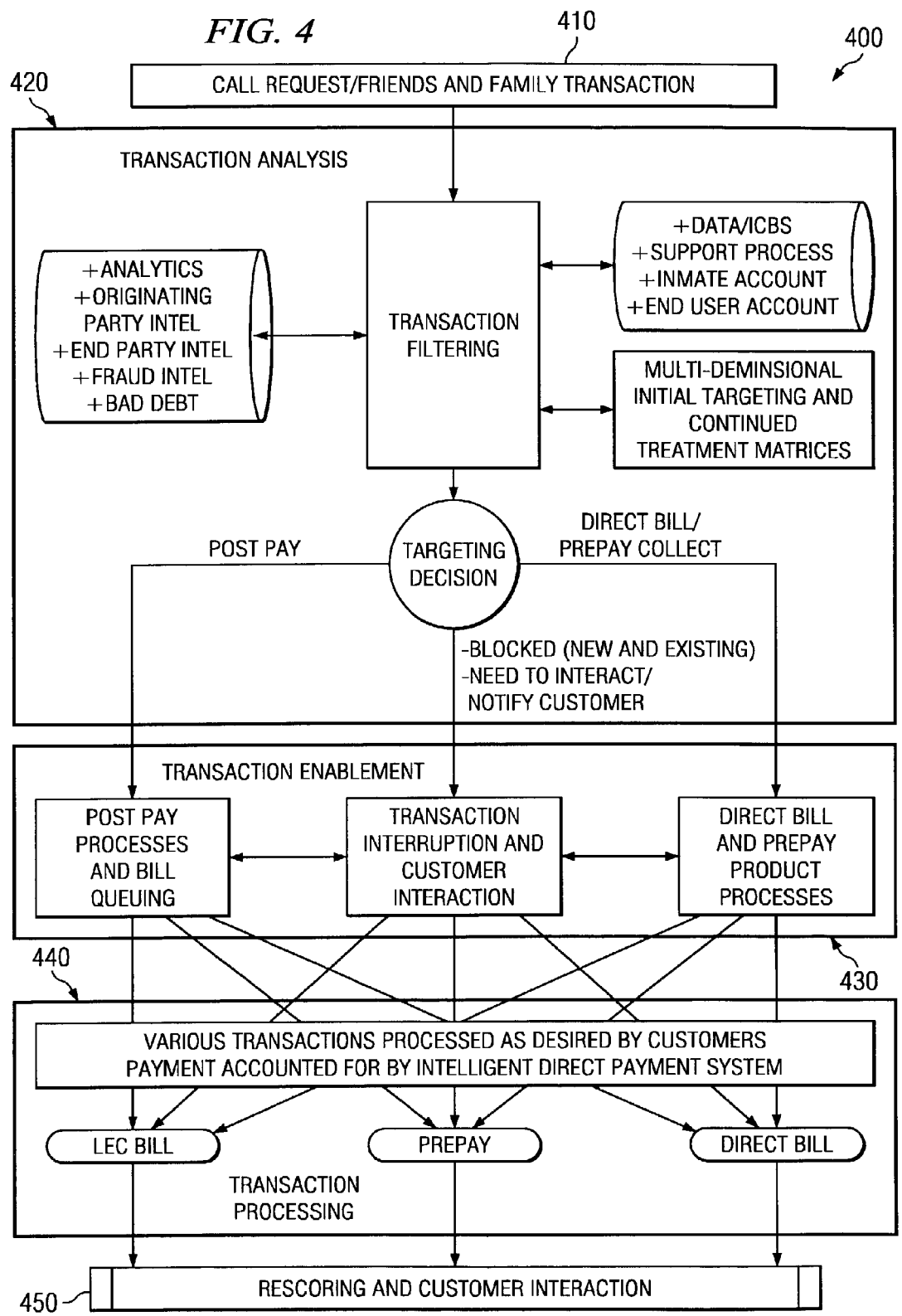
FIG. 4 shows a block diagram of a transaction system operable according to an embodiment of the present invention.

Directing attention to FIG. 4, a block diagram of transaction system 400 operable according to an embodiment of the present invention is shown. As illustrated in FIG. 4, a call request or other transaction request is initiated at box 410, such as may be initiated at call processor 130 by any of terminals 135A-135K and 125A-125M. Thereafter, box 420 provides transaction analysis with respect to the request, preferably utilizing transaction filtering, such as shown and described in the above reference patent application entitled "Systems and Methods for Transaction Authorization Determination," and as may utilize various intelligence and information, such as shown and described in the above referenced patent application entitled "Optimizing Profitability in Business Transactions." Processing according to box 420 of the illustrated embodiment provides a transaction service product targeting decision based upon the quality of one or more parties to the transaction and the means by which charges may be rendered to them, e.g., post pay third party billing, post pay direct bill, or prepaid. If the available information and/or a quality metric indicates the transaction should otherwise be blocked or that interaction with one or more of the parties to the transaction is needed, box 420 may determine that transaction interruption for such interaction is desirable. Box 430 provides for transaction enablement according to the targeting decision of box 420. Accordingly, transaction interruption and customer interaction, such as shown and described in the above referenced patent application entitled "System and Method for Account Establishment and Transaction Management Using Interrupt Messaging," may be implemented at box 430, such as may include soliciting information and/or payment from a party, invoking transaction service need demonstration, utilizing a customer service center, etcetera, according to the targeting decision of box 420 in order to facilitate the transaction. Likewise, post pay processes, preferably include intelligent bill queuing as described above for administrative efficiency and revenue optimization, or direct bill and prepay processes, such as may be invoked for existing account situations or where sufficient information is available to establish such accounts, may be implemented at box 430 according to the targeting decision of box 420. Box 440 provides transaction processing, wherein various transactions may be processed as desired by customers with payment for the transactions and/or transaction services being accounted for by payment system intelligence in cooperation with appropriate billing systems, e.g., a LEC billing system, a direct billing system, and a prepaid accounting system.

According to embodiment illustrated in FIG. 4, parties to the transactions may continue to be rescored, e.g., during a particular transaction and/or subsequent to completing a transaction, to update the targeting decision. For example, an initial targeting decision made in box 420 may be changed based upon subsequent rescoring and/or interaction at box 450. Likewise, a transaction record queuing decision and/or time made in box 430 may be adjusted or changed in response to such rescoring.

Having described features and functionality of preferred embodiments of the present invention herein, it should be readily appreciated that such features and functionality may be implemented as code operable upon processor-based systems. Accordingly, embodiments of any or all of call processor 130 and transaction processing platform 110, and intelligent queue 111, transaction record processor 112, risk analysis/account intelligence 113, and validation engine 114 thereof, may comprise computer program logic operable upon a central processing unit (CPU), having memory associated therewith, such as random access memory (RAM), read only memory (ROM), disk memory, and/or the like. For example, transaction processing platform 110 of an embodiment of the present invention may be implemented upon a general purpose computer system platform, such as a computer system based upon the Intel PENTIUM family of processors as are well known in the art.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing calling records for collection, said method comprising:
   providing call connections between calling parties on an originating carrier network and called parties on destination carrier networks, wherein costs for the call connections are to be billed to third parties, the third parties being other than the calling parties;
   generating a third party call record for each call connection;
   storing each of the third party call records in a queue;
   assigning a queue time to each of third party call records stored in the queue, the queue time representing a time at which the third party call records will be forwarded to a third party for payment;
   calculating an accumulated balance for each third party, the accumulated balance representing a total unbilled amount for the third party's call records stored in the queue;
   monitoring an amount of each third party's accumulated balance with respect to a threshold amount;
   adjusting the queue time of at least one third party call record when the accumulated balance amount meets or exceeds the threshold amount; and
   releasing one or more third party calling record from said queue to a billing process when the queue time expires.

2. The method of claim 1, wherein the call connections are collect call connections and the third party is the called party.

3. The method of claim 1, wherein the third party is a calling card provider.

4. The method of claim 1, wherein the third party is a local exchange carrier (LEC).

5. The method of claim 1, wherein the billing process comprises a local exchange carrier (LEC) billing process.

6. The method of claim 1, wherein the billing process comprises a direct billing process.

7. The method of claim 1, further comprising:
   preventing additional call connections associated with a particular third party when the particular third party's accumulated balance amount meets or exceeds the threshold amount.

8. The method of claim 1, further comprising:
   contacting a selected third party when the accumulated balance amount for the selected third party meets or exceeds the threshold amount; and
   providing the selected third party with an alternative billing plan to clear the accumulated balance amount.

9. The method of claim 8, wherein said alternative billing plan is:
   a local-exchange, post-paid billing plan;
   a post-paid, direct billing plan; or
   a prepaid plan.

10. The method of claim 1, further comprising:
    accepting direct payment for at least one third party calling record directly from said third party.

11. The method of claim 1, further comprising:
    monitoring a rate at which the amount of each third party's accumulated balance increases.

12. The method of claim 1, further comprising:
    receiving a risk score for a selected third party; and
    adjusting the queue time of at least one third party call record associated with the selected third party when the risk score meets or exceeds a predetermined level.

13. The method of claim 12, wherein the risk score is a function of fraudulent activity.

14. The method of claim 1, further comprising:
    adjusting the queue time of at least one third party call record based upon a selected billing cycle.

15. A method for processing calling records for collection, said method comprising:
    providing call connections between calling parties on an originating carrier network and called parties on destination carrier networks, wherein costs for the call connections are to be billed to third parties, the third parties being other than the calling parties;
    generating a third party call record for each call connection;
    storing each of the third party call records in a queue;
    assigning a queue time to each of third party call records stored in the queue, the queue time representing a time at which the third party call records will be forwarded to a third party for payment;
    calculating an accumulated balance for each third party, the accumulated balance representing a total unbilled amount for the third party's call records stored in the queue;
    monitoring a rate at which an amount of each third party's accumulated balance increases;
    adjusting the queue time of a selected third party's call records when the rate at which the third party's accumulated balance amount exceeds a predetermined rate; and
    releasing one or more third party calling record from said queue to a billing process when the queue time expires.

16. The method of claim 15, wherein the billing process comprises a local exchange carrier (LEC) billing process.

17. The method of claim 15, wherein the billing process comprises a direct billing process.

18. The method of claim 15, wherein the billing process comprises a calling card account.

19. The method of claim 15, further comprising:
    preventing additional call connections associated with a particular third party when the particular third party's accumulated balance amount meets or exceeds a threshold amount.

20. The method of claim 19, further comprising:
    contacting a selected third party when the accumulated balance amount for the selected third party meets or exceeds the threshold amount; and
    providing the selected third party with an alternative billing plan to clear the accumulated balance amount.

21. The method of claim 9, further comprising:
    adjusting the queue time of at least one third party call record based upon a selected billing cycle.

22. A method for processing calling records for collection, said method comprising:
    providing call connections between calling parties on an originating carrier network and called parties on destination carrier networks, wherein costs for the call connections are to be billed to third parties, the third parties being other than the calling parties;
    generating a third party call record for each call connection;
    storing each of the third party call records in a queue;
    assigning a queue time to each of third party call records stored in the queue, the queue time representing a time at which the third party call records will be forwarded to a third party for payment;

calculating an accumulated balance for each third party, the accumulated balance representing a total unbilled amount for the third party's call records stored in the queue;

receiving a risk score for a selected third party; and adjusting the queue time of at least one third party call record associated with the selected third party when the risk score meets or exceeds a predetermined level; and releasing one or more third party calling record from said queue to a billing process when the queue time expires.

23. The method of claim 22, wherein the risk score is a function of fraudulent activity.

24. The method of claim 22, wherein calling party is an inmate, and wherein the risk score is a function of the type of facility in which the inmate is incarcerated.

25. The method of claim 22, wherein the risk score is a function of the type of facility in which the calling party resides.

26. The method of claim 22, wherein the risk score is adjusted based upon information from the destination carrier networks.

27. The method of claim 22, wherein the information from the destination carrier networks comprises an account status for called parties.

* * * * *